US011666944B1

(12) United States Patent
De La Rosa et al.

(10) Patent No.: US 11,666,944 B1
(45) Date of Patent: Jun. 6, 2023

(54) DETECTION OF OVERFILLED CONTAINERS IN SORTATION SYSTEMS

(71) Applicant: Amazon Technologies, Inc., Seattle, WA (US)

(72) Inventors: Jose Luis De La Rosa, Seattle, WA (US); Larry Joe Robb, Miramar Beach, FL (US); Maxim P. Hoffman, Bothell, WA (US); Joshua Martin Middleton, Seattle, WA (US); Stephanie Tomasetta, Seattle, WA (US); Roland J. Menassa, Renton, WA (US); Justin Stone, Frisco, TX (US); Molly Nawalinski, Seattle, WA (US); Fernando Zumbado, Seattle, WA (US); Duncan Pratt, Issaquah, WA (US); Jon David DeFant, Seattle, WA (US)

(73) Assignee: Amazon Technologies, Inc., Seattle, WA (US)

( * ) Notice: Subject to any disclaimer, the term of this patent is extended or adjusted under 35 U.S.C. 154(b) by 374 days.

(21) Appl. No.: 16/886,055

(22) Filed: May 28, 2020

(51) Int. Cl.
*B07C 3/00* (2006.01)
*G01F 23/28* (2006.01)

(52) U.S. Cl.
CPC .............. *B07C 3/008* (2013.01); *G01F 23/28* (2013.01)

(58) Field of Classification Search
CPC ............ B07C 3/008; B07C 3/00; G01F 23/28
See application file for complete search history.

(56) References Cited

U.S. PATENT DOCUMENTS

| 4,688,678 | A | * | 8/1987 | Zue | B07C 3/082 209/900 |
| 5,419,457 | A | * | 5/1995 | Ross | B65G 47/763 198/367 |
| 5,794,789 | A | * | 8/1998 | Payson | B07C 7/00 209/583 |
| 6,283,304 | B1 | * | 9/2001 | Gottlieb | B07C 3/00 700/223 |
| 6,347,710 | B1 | * | 2/2002 | Ryan, Jr. | B07C 3/008 209/706 |
| 6,588,678 | B1 | * | 7/2003 | Mattes | F02D 41/2096 239/584 |
| 2010/0315246 | A1 | * | 12/2010 | Gilpatrick | G01F 23/04 340/623 |
| 2019/0147710 | A1 | * | 5/2019 | Carley | H05B 45/20 340/815.45 |

FOREIGN PATENT DOCUMENTS

CN 110721914 A * 1/2020

* cited by examiner

*Primary Examiner* — Patrick H Mackey
(74) *Attorney, Agent, or Firm* — Eversheds Sutherland (US) LLP

(57) ABSTRACT

Systems, methods, and computer-readable media are disclosed for detection of overfilled containers in sortation systems. In one embodiment, an example container capacity detection system for use with an item sortation machine may include a first sensor positioned to detect a remaining capacity of a first container in the item sortation system, and a controller. The controller may be configured to determine, using the first sensor, that the remaining capacity of the first container is less than or equal to a first threshold, and to send a signal.

19 Claims, 8 Drawing Sheets

DETECTION OF OVERFILLED CONTAINERS IN SORTATION SYSTEMS

BACKGROUND

As users increasingly make online purchases, fulfilment of such purchases and other orders may become increasingly complicated. For example, a fulfillment center may have output of upwards of one million packages per day. With such demands, efficiency of logistics related to processing orders and packages may be important. Accordingly, improvements in various operations of order fulfillment, such as improvements to picking technology, sorting technology, packing technology, and so forth may be desired, such that throughput can be increased and sustainability can be improved.

Figure 1:
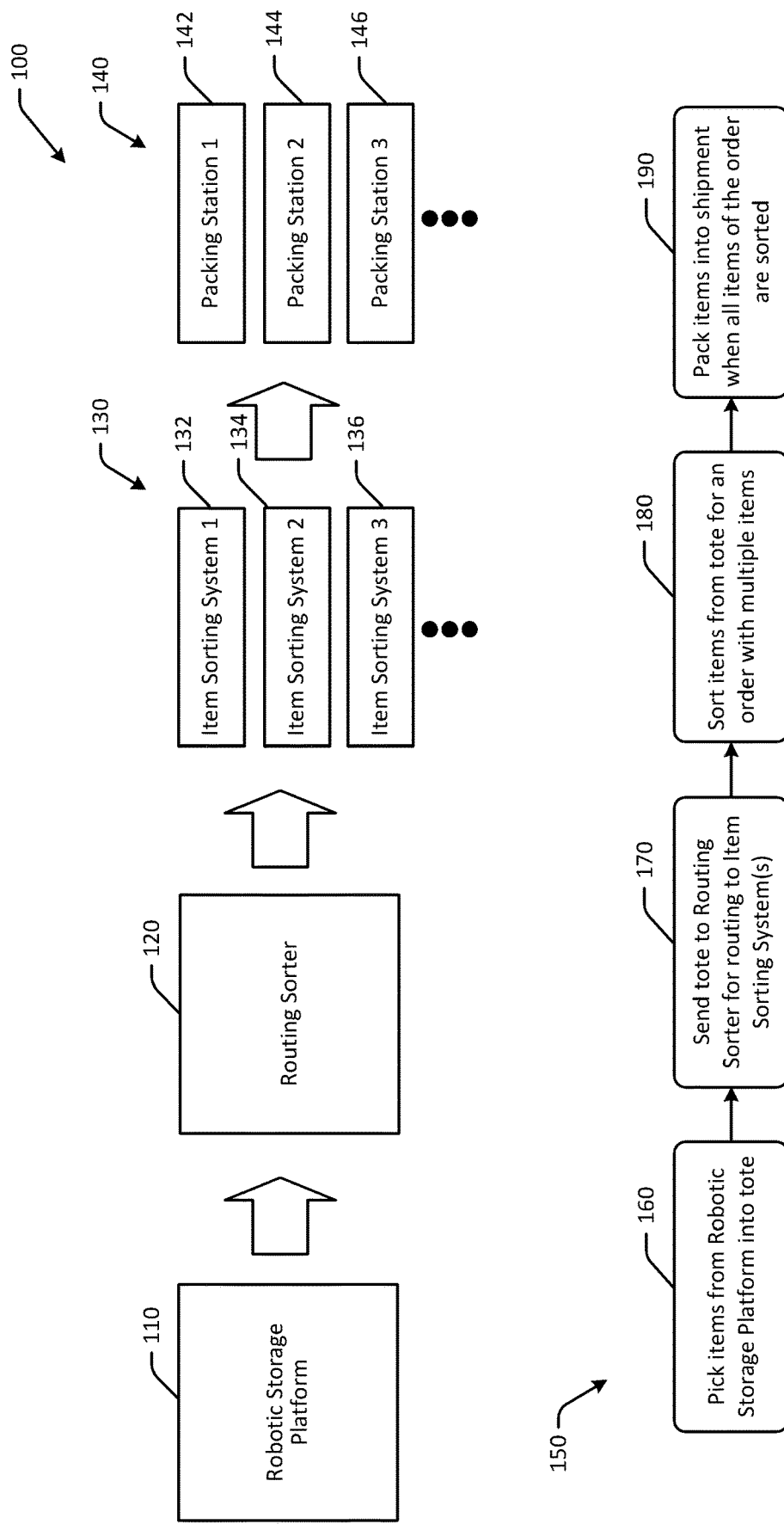
FIG. 1 is a hybrid schematic illustration of an example use case for detection of overfilled containers in sortation systems and an example process flow in accordance with one or more embodiments of the disclosure.

The detailed description is set forth with reference to the accompanying drawings. The drawings are provided for purposes of illustration only and merely depict example embodiments of the disclosure. The drawings are provided to facilitate understanding of the disclosure and shall not be deemed to limit the breadth, scope, or applicability of the disclosure. The use of the same reference numerals indicates similar, but not necessarily the same or identical components. Different reference numerals may be used to identify similar components. Various embodiments may utilize elements or components other than those illustrated in the drawings, and some elements and/or components may not be present in various embodiments. The use of singular terminology to describe a component or element may, depending on the context, encompass a plural number of such components or elements and vice versa.

DETAILED DESCRIPTION

Overview

Fulfillment centers may be used to fulfill online purchases and other orders. For example, fulfillment centers may include product inventory that may be pulled when an order for a particular product or multiple products is placed. In some instances, the product(s) may be packed and shipped from the fulfillment center. However, the process of obtaining the product(s), packing the product(s), and shipping the product(s) may be complicated due to the amount of inventory, the number of orders to process, the size of the fulfillment center, and/or other factors. In addition, a portion of the fulfillment center designated for packing or shipping may be different than the portion of the fulfillment center designated for holding product inventory. As a result, transportation of products and/or shipping of packages in an order may be time consuming.

In some instances, orders for products may include multiple items. For example, a user may place an order for two or more products. In such instances, the products that are ordered may not be in the same location of the fulfillment center, or one of the products may take a longer time to obtain or pick than the others. As a result, packing of the order may be delayed until all of the items in the order are ready for packing. To improve the speed of processing orders, in certain instances, robots and other technology may be deployed, such that manual efforts can be redirected to other tasks. For example, robots may be used to assist with locating products in an order during a pick process. However, directing picked products to the appropriate packing station and/or location may form a bottleneck in the operation of the fulfillment center. For example, after products are picked, the products may be placed in a container, such as a tote or other container, and directed to sortation machines to direct the picked products to the appropriate packing location. For example, products in the same order may be directed to the same packing location for consolidation and subsequent packing. However, a tote or other container may include products that are to be sorted to multiple different packing locations, and the sortation process may be slowed by sheer volume of products that are to be processed and/or sorted. In addition, in some instances, items that are part of the same order may not all be in the same fulfillment center or other location. For example, a first product in an order of two items may be at a first fulfillment center, and a second product in the same order may be at a second fulfillment center. In such instances, instead of shipping the two items in the order separately, such as one from each fulfillment center, items may be transferred from one fulfillment center to another, and then aggregated with other items in the order and shipped together. Such fulfillment center-to-fulfillment center transfers of items may be processed similar to items that are to be shipped to consumers. For example, the items to be transferred may be picked, routed to a sortation machine, sorted into a particular container (e.g., a container designated for a particular fulfillment center, etc.), packed, and sent. In some instances, containers destined for other fulfillment centers may be infinite bottom or bottomless containers, or containers that may be filled without consideration of a level of fullness or remaining capacity of the container. In such instances, capacity of the containers may be monitored externally (e.g., by a user manually, by a camera system automatically, using different sensors, etc.). Full containers may be removed from a sortation system and replaced with an empty container to continue aggregating items destined for a fulfillment center. However, determining the capacity of containers may be difficult in instances where visibility into containers is obstructed. In addition, the number of containers to monitor, as well as the speed at which items are sorted into containers may make determining container capacity difficult.

Embodiments of the disclosure include methods and systems for automated item sorting that may improve processing and fulfillment of single and multi-item orders, or orders that include more than one item. Certain embodiments include container capacity detection systems that can be removably coupled to item sortation systems, and are configured to determine remaining capacity and/or fullness levels of containers. Embodiments may include visual indicators, such as one or more lights (e.g., light emitting diodes, organic light emitting diodes, etc.), one or more displays, or other visual indicators, that may indicate that a container is full and/or is to be replaced with an empty container. In some instances, the visual indicators may represent to an operator the fullness level or remaining capacity of a container. Containers may be manually or automatically removed from the item sortation system and optionally replaced with an empty container. Embodiments may remove or reduce the need to estimate container capacity based on volume or dimension information associated with items deposited into a container. Embodiments may therefore increase throughput and speed of consolidating items for multi-item orders and/or consolidating packages that are destined for certain related destinations, such as other fulfillment centers. Some embodiments include optimized process flows for processing of orders at fulfillment centers, as well as process flows or equipment to increase speed of consolidating products in a multi-item order and/or speed of sorting packages. As a result, throughput of fulfillment centers may be improved, and/or logistics of fulfillment center operations may be less complicated.

Certain embodiments may include sensors, such as Lidar sensors, lasers, depth sensors, cameras, three-dimensional sensors, or other sensors that are configured to determine whether a particular container is full (as defined by a certain remaining capacity threshold or occupied capacity threshold), and/or whether a threshold amount of a container is filled or remains. Based at least in part on sensor data, one or more visual indicators may be triggered to indicate to an operator the corresponding fill level, remaining capacity, and/or whether a particular fill container is to be replaced due to fullness. The system may be independent of an item sortation system and may be retrofitted. Some embodiments may communicate with item sortation systems to prevent delivery of items to full containers.

Referring to FIG. 1, an example use case 100 for detection of overfilled containers in sortation systems and an example process flow in accordance with one or more embodiments of the disclosure. Although discussed in the context of online orders, other embodiments may be directed to any suitable use case where products are picked and sorted, or packages are sorted, such as instances where users may pick up orders rather than receiving a shipment, instances where items are aggregated for transport to another fulfillment center, and so forth.

In FIG. 1, a fulfillment center may include a robotic storage platform 110, a routing sorter 120, one or more item sorting systems 130, and one or more packing stations 140. The robotic storage platform 110 may be a portion of the fulfillment center at which products picked from product inventory are placed. Robots may be used to pick products from inventory and to deliver to the robotic storage platform in some instances, while in other instances, manual effort or a combination thereof may be used to pick products. The picking process at the robotic storage platform may include locating a product in an order, obtaining the product, and sending the product to the robotic storage platform 110, such as via a conveyor belt. In the illustrated embodiment, products at the robotic storage platform 110 may be placed in a container, such as a tote. The tote may be assigned to, or otherwise associated with, a particular item sorting system machine. For example, a certain tote may be associated with a certain item sorting system, such that products that are designated to be picked and placed in the tote are for orders that are to be consolidated at that particular item sorting system. The association between the tote and the item sorting system may be static in some instances. In other embodiments, there may not be any association between totes and item sorting systems, or associations may be dynamic.

At the routing sorter 120, totes including products that have been picked may be routed to the appropriate or designated item sorting system. For example, the routing sorter 120 may optionally determine an identifier associated with the tote, and may determine one or more item sorting systems to which the tote is to be routed using the identifier or using another factor, such as sortation system load. The routing sorter 120 may route or direct the tote to an item sorting system.

The item sorting systems 130 may include one or more item sorting system machines. In FIG. 1, a first item sorting system 132, a second item sorting system 134, a third item sorting system 136, and so forth may be included. Any number of item sorting systems may be included. Some or all of the item sorting systems may optionally be associated with certain totes. The item sorting systems may be used to consolidate or otherwise aggregate products for single or multi-item orders and/or for transfer to a different fulfillment center. For example, a first tote may include a first item of a multi-item order, and a second tote may include a second item of the multi-item order. The item sorting system may therefore identify the orders associated with the respective products in a tote, and may transport the products to a container, such as a tote, a flexible container, a specific chute leading to a container, or a different container associated with the order. When the order is complete with all of the products in the associated chute or container, the order may be packed. In instances where a container is designated for a different fulfillment center, as opposed to an online order, the container may be packed when full, as opposed to when certain items are placed into the container (e.g., there may not be any specific items that need to be in the container before packing, rather, the container may just be a certain threshold full, etc.). Accordingly, a specific item sorting system may be designated for fulfillment of a particular multi-item order. As a result, all of the products in the multi-item order may be placed in totes that are directed to that particular item sorting system. At the item sorting systems 130, totes that are received via the routing sorter 120 may be emptied, and the products in the respective totes may be transported to the appropriate chutes or containers for the orders for which the products were picked.

After a single or multi-item order is complete (e.g., the item sorting system has delivered all of the products in the order to the appropriate chute, container, etc.), or when a container designated for another fulfillment center is full (where full is a configurable threshold, such as about 60% full capacity, 70% full capacity, 80% full capacity, 90% full capacity, or the corresponding remaining capacity such as 40% remaining capacity, 50% remaining capacity, etc.), the order may be packed at the packing station 140. In some embodiments, one or more packing stations may be included. In some instances, a packing station may service more than one item sorting system, while in other instances, more than one packing station may service one item sorting system. In the illustration of FIG. 1, a first packing station 142 may be used to pack orders from the first item sorting system 132, a second packing station 144 may be used to pack orders from the second item sorting system 134, a third packing station 146 may be used to pack orders from the third item sorting system 136, and so forth. At the packing stations 140, the orders may be placed into boxes and sealed for subsequent shipment. The packages may then be processed for shipment to the user. In another example, the containers may be stacked, closed, or otherwise packed for shipment to another fulfillment center.

At the fulfillment center, an example process flow 150 illustrated in FIG. 1 may be implemented to improve the efficiency and/or throughput of the fulfillment center. At a first block 160, items may be picked from the robotic storage platform 110 into a tote that may optionally be associated with a specific item sorting system. At a second block 170, the tote may be sent to the routing sorter 120 for routing to an item sorting system. At a third block 180, the items from the tote may be sorted for an order with multiple item by the specific item sorting system. At a fourth block 190, the items may be packed into a shipment when all of the items in the order are sorted.

Figure 2:
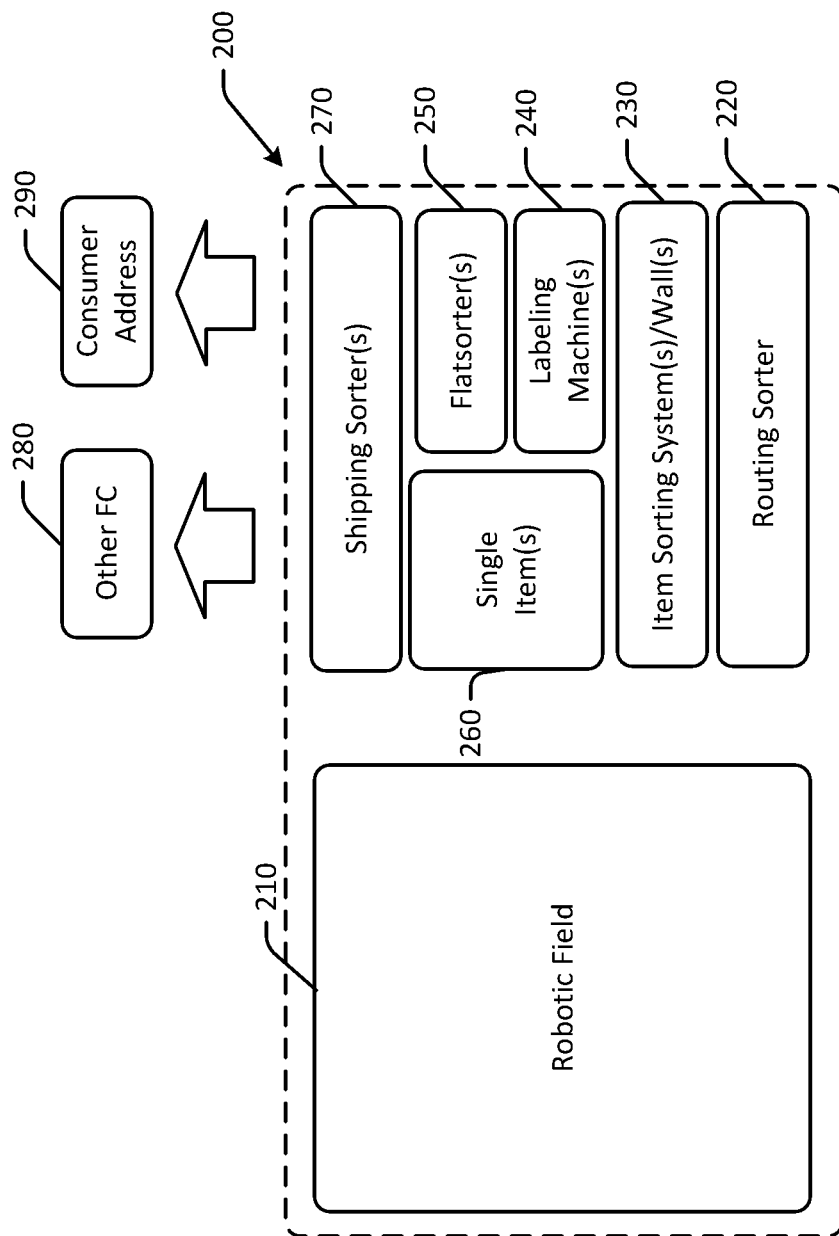
FIG. 2 is a hybrid schematic illustration of an example use case for detection of overfilled containers in sortation systems in accordance with one or more embodiments of the disclosure.

FIG. 2 is a hybrid schematic illustration of an example use case for detection of overfilled containers in sortation systems in accordance with one or more embodiments of the disclosure. Other embodiments may include additional or fewer components.

In FIG. 2, an example layout of a fulfillment center 200 is depicted. The fulfillment center 200 may include a robotic field 210 at which product inventory may be stored for picking, one or more routing sorters 220 that may be used to direct totes or other containers to item sorting systems, one or more item sorting systems or walls 230 used to consolidate products for multi-item orders and/or to pack multi-item orders, one or more single item sections 260 that may be used to pack single item orders, one or more labeling machines 240 that may be used to apply shipping labels to packages, one or more flat sorters 250 and shipping sorters 270 to sort labeled shipments (e.g., by destination, carrier, etc.) for pickup from the fulfillment center 200.

In some embodiments, the item sorting systems described herein may be a part of the flat sorters 250, where the item sorting systems may be configured to sort packages into containers or chutes. In such embodiments, the item sorting systems may or may not also be used at the item sorting systems 230 portion of the fulfillment center 200. Accordingly, the item sorting systems may be disposed at, or otherwise coupled to, a cross belt conveyor system, such as the flat sorters 250 of the fulfillment center 200.

The item sorting system machines 230 may include containers and/or containers of different sizes (e.g., small, medium, large, etc.) and may be configured, in one example, to handle items that weigh up to twenty or more pounds (e.g., 100 pounds or more, etc.). In some embodiments, the item sorting system machines 230 may include multiple chutes, such as about 328 chutes, and may be configured to sort items at a rate of about 2,100 units per hour or more. In some instances, the item sorting system machines 230 may have two inductors (e.g., one on each side, etc.), and may be modular. For example, the item sorting system machines 230 may each include sixteen expansion modules, where expansion modules may be defined as three two-sided columns next to one another for a total length of about 80 feet. The item sorting system machines 230 may reduce labor and capital costs associated with processing orders.

In some embodiments, the item sorting system 230 may replace other processes, such as manual sortation processes. The item sorting system 230 may be a cross-belt shuttle sorter that sorts singulated products into containers or totes. Item sorting systems 230 may be capable of sorting at a rate of 2,100 units per hour or more. Certain item sorting systems 230 may be configured to handle items of up to twenty pounds, or more in some instances, with dimensions of about 18"×14"×8" or greater, which may cover almost all products at the fulfillment center 200. The item sorting systems 230 may operate as a high-speed, high-destination sort solution that intakes items or packages and sorts them into containers using a shuttle that travels vertically and horizontally inside the machine (or outside the machine in some instances).

Individual item sorting system machines may be item sorting systems, and may include a number of, such as two or more, modular sorting machines coupled in series, or otherwise adjacent to each other and connected. The modular sorting machines may include a first modular sorting machine. The modular sorting machines may be configured to singulate items from a tote comprising a plurality of items into a plurality of chutes or containers (e.g. induct individual items from a container that has multiple items, and place the inducted items into the appropriate chute to be routed to a container, where chutes or containers are associated with multi-item orders). The tote from which items are inducted may be associated with the individual item sorting system machine (e.g., the modular sorting machines that form the individual item sorting system machine, etc.). In some embodiments, item sorting systems or individual item sorting machines may be configured to induct and sort packages based at least in part on a destination of the respective packages. Destinations may be internal destinations within a fulfillment center, external destinations to geographic regions or addresses, or other destination types. For example, output from the fulfillment center 200 may include containers of items routed to other fulfillment centers 280, packages addressed to consumer addresses 290, and so forth.

Accordingly, in some embodiments, item sorting systems may be arranged in rows and may receive totes from a routing sorter, thereby streamlining fulfillment center operation and reducing labor and space costs. The item sorting systems may process totes for multi-order sortation and consolidation. As a result, there may no longer be a need to singulate and send items to a wall for manual extraction, because each tote may be assigned to a particular item sorting system machine. Induct stations can be replaced with item sorting system machines.

In another embodiment, pickers may pick items directly to a segmented belt conveyor at a station that may be near an item sorting system machine. Other nearby pick stations may also pick items directly to conveyance for the same item sorting system machine. Picked items being transported to a single item sorting system machine may merge together to be inducted into their unique item sorting system machine, where multi-item orders may be consolidated and sent to packing.

Embodiments of the disclosure include detection of overfilled containers in sortation systems. The container capacity detection systems described herein may improve speed of item sortation by automatically detecting full containers and triggering visual indicators indicating that a particular container is to be replaced with an empty container. Some embodiments may remove the need to identify items prior to sortation, as actual dimension information and/or container capacity may be used instead of estimations based on item volume data. Certain embodiments may include visual indicators, such as one or more lights, that indicate various fill levels of containers to provide container capacity data without requiring visualization of containers. Some embodiments may be independent of item sortation systems and may therefore be retrofitted to sortation systems to provide enhanced functionality. Certain embodiments may improve processing speed and/or throughput of fulfillment centers. Certain embodiments may improve performance of mechanical equipment for sortation and/or consolidation of items for multi-item orders. While described in the context of online orders, aspects of this disclosure are more broadly applicable to other forms of product sortation.

Example embodiments of the disclosure provide a number of technical features or technical effects. For example, in accordance with example embodiments of the disclosure, certain embodiments of the disclosure may improve processing speed, throughput, and/or efficiency of fulfillment centers. The above examples of technical features and/or technical effects of example embodiments of the disclosure are merely illustrative and not exhaustive.

One or more illustrative embodiments of the disclosure have been described above. The above-described embodiments are merely illustrative of the scope of this disclosure and are not intended to be limiting in any way. Accordingly, variations, modifications, and equivalents of the embodiments disclosed herein are also within the scope of this disclosure. The above-described embodiments and additional and/or alternative embodiments of the disclosure will be described in detail hereinafter through reference to the accompanying drawings.

Illustrative Embodiments and Use Cases

Figure 3:
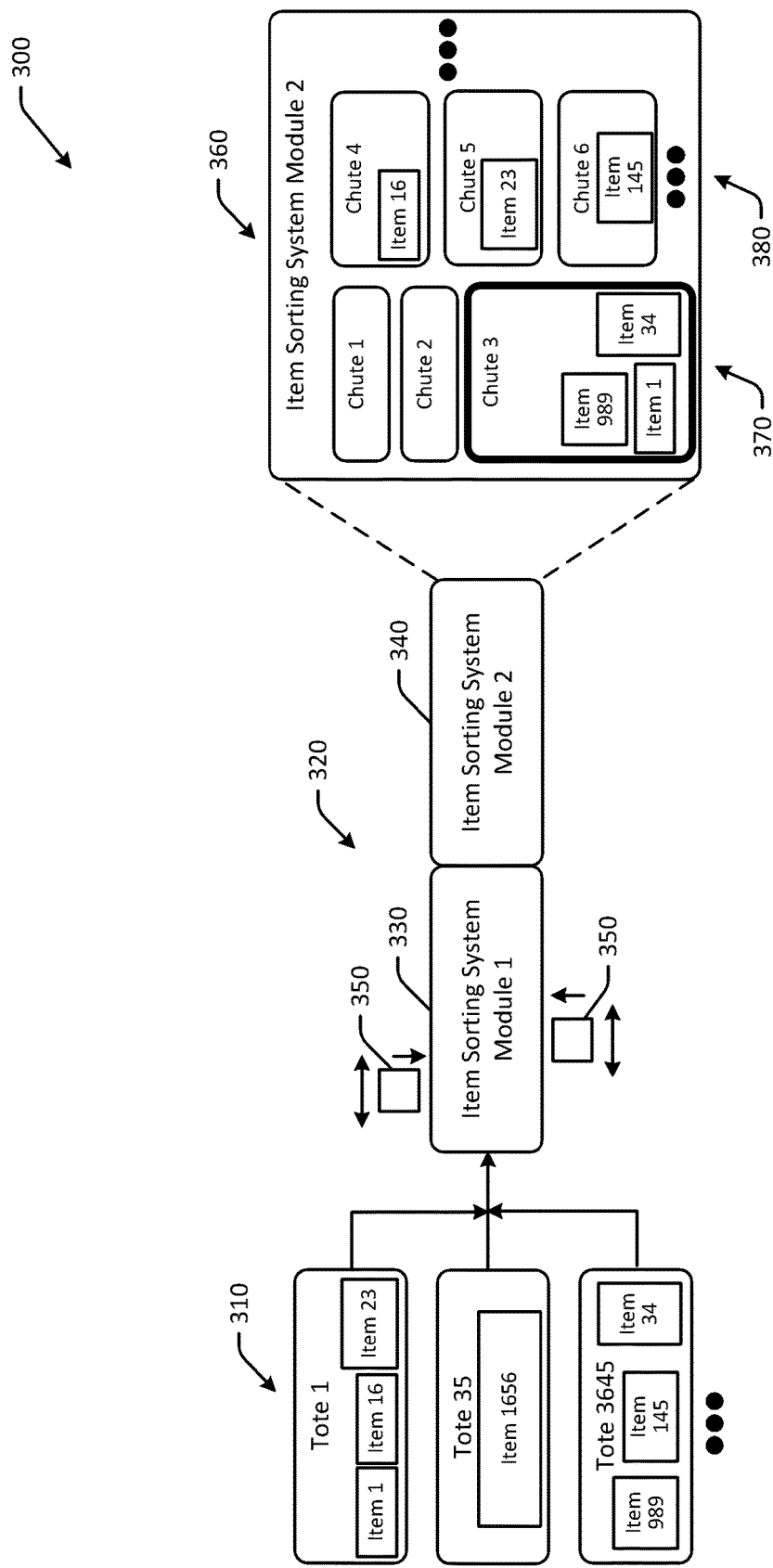
FIG. 3 is a schematic illustration of an item sorting system and additional components in accordance with one or more embodiments of the disclosure.

FIG. 3 is a schematic illustration of an item sorting system and additional components in accordance with one or more embodiments of the disclosure. Other embodiments may include additional or fewer components. The illustration of FIG. 3 is not to scale, and may not be illustrated to scale with respect to other figures. The item sorting system illustrated in FIG. 3 may be the same item sorting system discussed with respect to FIGS. 1-2.

In FIG. 3, an example use case 300 including a set of totes 310 and an item sorting system, or a multi-module item sorting machine 320, is depicted. The set of totes 310 may include one or more totes that may optionally be assigned to, or otherwise routed to, the item sorting system 320. For example, Tote 1, Tote 35, Tote 3645, and so forth may be routed to the item sorting system 320. The totes may have identifiers, such as alphanumeric or other identifiers. The totes may be used to place items that have been picked into the totes. The items that are placed in the totes may be associated with orders that are to be consolidated by the item sorting system 320, or may be items that are to be transferred to a different fulfillment center. For example, Tote 1 may include item 1, item 16, and item 23, Tote 35 may include item 1656, Tote 3645 may include item 989, item 145, and item 34, and so forth. The item sorting system, or the item sorting machines 320, may be configured to receive items from a tote that includes one or more, such as multiple items, and the tote may be assigned to, or otherwise routed to, the item sorting system or the item sorting machine 320.

The totes 310 may be directed to the item sorting system 320 for sorting and consolidation. For example, items in the totes 310 may be inducted into the item sorting system 320 via a conveyor belt.

The item sorting system machine 320 may include one or more modules, and may be adjusted in size by adding or removing modules as needed. For example, the item sorting system 320 may include a first modular item sorting machine 330 and a second modular item sorting machine 340. The second modular item sorting machine 340 may be coupled to the first modular item sorting machine 330.

The first modular item sorting machine 330 may include a first support disposed on a first side of the first modular item sorting machine 330, and a second support disposed on the first side of the first modular item sorting machine 330. One or more chutes may be coupled to one or more sides of the first modular item sorting machine 330 and/or the second modular item sorting machine 340. The first modular item sorting machine 330 may include a first chute positioned at a first location, and a second chute positioned at a second location. The first chute and the second chute may have the same dimensions or different dimensions. In some embodiments, containers or chutes may be disposed about more than one side of the first modular item sorting machine 330.

The second modular item sorting machine 340 may include a third support disposed on the first side of the second modular item sorting machine 340, and a fourth support disposed on the first side of the second modular item sorting machine 340. One or more chutes may be coupled to one or more sides of the second modular item sorting machine 340. The second modular item sorting machine 340 may include a third chute positioned at a first location, and a fourth chute positioned at a second location. The third chute and the fourth chute may have the same dimensions or different dimensions, and may have different dimensions than the first chute and/or the second chute. The first chute, the second chute, the third chute, and/or the fourth chute can be rearranged in different vertical or horizontal locations and/or coupled to different containers, and may be configured to receive packages, items of orders comprising multiple items, or other items. In some embodiments, containers and corresponding chutes may be disposed about more than one side of the second modular item sorting machine 340.

The respective modules of the item sorting system machine 320 may include one or more chutes that hold multiple items. For example, as illustrated in side view 360, the second modular item sorting machine 340 may include a first set of chutes 370, and a second set of chutes 380. The item sorting system machine 320 may include a plurality of chutes disposed in an array or other arrangement along one or more sides of the first modular item sorting machine 330 and the second modular item sorting machine 340. In FIG. 3, Chute 1 and Chute 2 may have the same dimensions, while Chute 3 in the same column may have a different dimension. Any suitable number of chute may be included.

Items or packages inducted (e.g., from the totes 310, from a conveyor belt, etc.) may be sorted and directed to a chute associated with the item or package. The items may be transported by one or more shuttles 350, which may move in one or more directions within the item sorting system machine 320. In some embodiments, the shuttles 350 may be positioned outside of the item sorting system machine 320.

For example, Item 1 may be inducted from Tote 1 and placed in Chute 3, along with Item 989 and Item 34 from Tote 3645. Chute 3 may be associated with an order that included those three items, and may therefore be ready for packing. Similarly, Item 16 may be routed to Chute 4, Item 23 may be routed to Chute 5, Item 145 may be routed to Chute 6, and so forth. Any number of chutes, containers, totes, and/or modules may be included.

Figure 4:
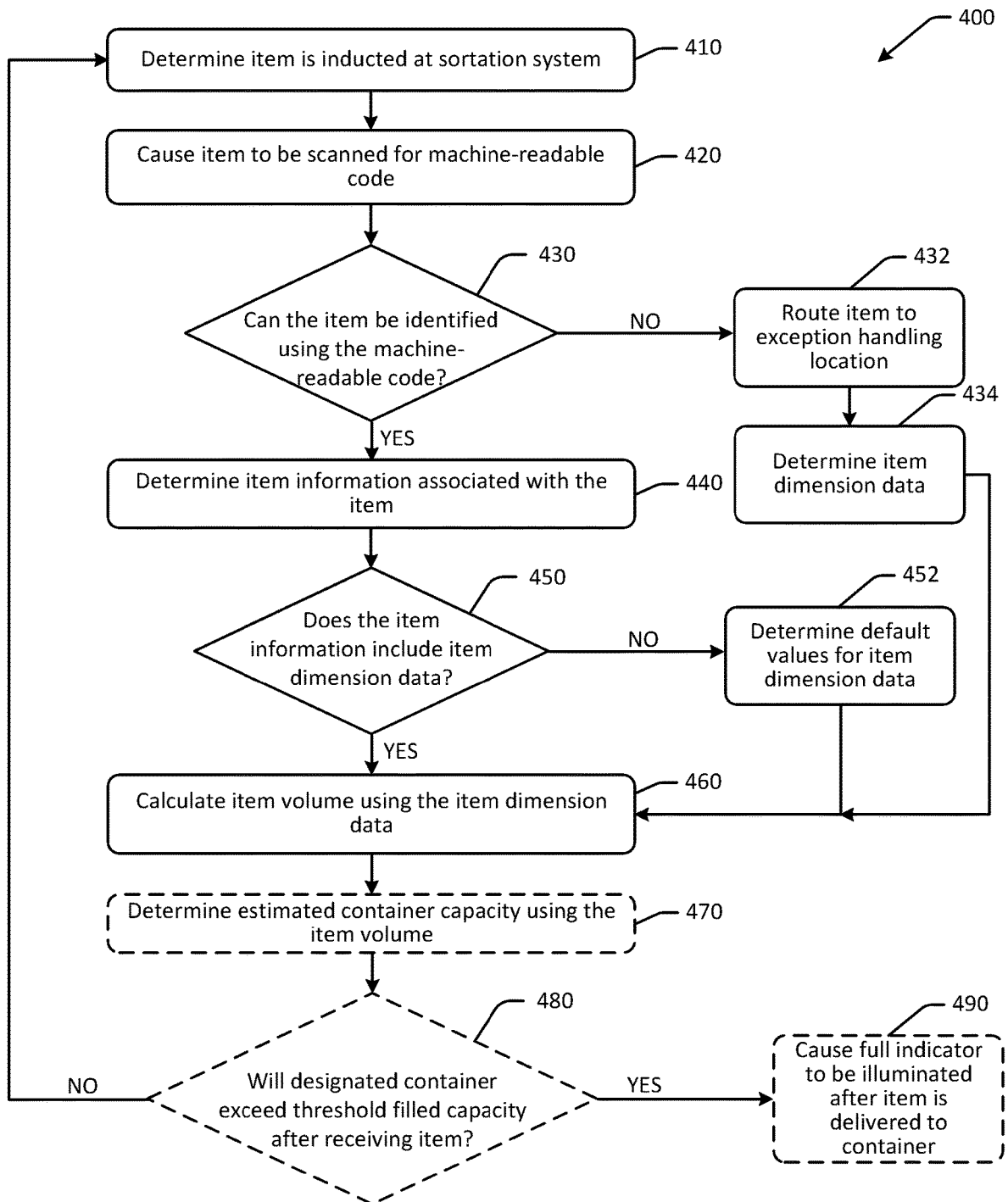
FIG. 4 is an example process flow for detection of overfilled containers in sortation systems in accordance with one or more embodiments of the disclosure.

FIG. 4 is an example process flow 400 for detection of overfilled containers in sortation systems in accordance with one or more embodiments of the disclosure. Although example embodiments of the disclosure may be described in the context of bottomless containers, it should be appreciated that the disclosure is more broadly applicable to any suitable item sortation process. Some or all of the blocks of the process flows in this disclosure may be performed in a distributed manner across any number of devices. The operations of the process flow 400 may be optional and may be performed in a different order.

The process flow 400 may be performed by one or more computer systems, such as a computer system or controller associated with an item sortation system and/or a computer system or controller associated with a container capacity detection system. The process flow 400 may be used to route items to containers without predetermined item dimension information, which may improve sortation system throughput.

At block 410 of the process flow 400, an item may be inducted at a sortation system. The item may be inducted or otherwise input manually or automatically. For example, items may be singulated from a container and inducted into the sortation system for sortation to a particular container and/or chute.

At block 420, the item may be scanned for a machine-readable code. For example, a computer system associated with the item sortation system and/or a capacity detection system coupled to the item sortation system may be configured to cause the item to be scanned for a machine-readable code. A barcode scanner, laser, camera, or other sensor may be used to scan the item for the machine-readable code. The machine-readable code may be any suitable machine-readable indicia, such as a barcode, a quick read code, a smile code, an RFID tag, or a different type of machine-readable code.

At determination block 430, a determination may be made as to whether the item can be identified using the machine-readable code. For example, if the machine-readable code was readable and/or successfully scanned at block 420, the determination at determination block 430 may be positive. If the machine-readable code was not read or successfully scanned at block 420 (e.g., the code was blocked or damaged, the item moved too fast, etc.), or if no information associated with a code that was read can be determined, the determination at determination block 430 may be negative. If it is determined at determination block 430 that the item cannot be identified using the machine-readable code, the process flow 400 may end at block 432, at which the item may be routed to an exception handling location. At the exception handling location, an operator may manually identify and/or scan the item, or the item may be automatically routed back to the induction portion of the item sortation system for another attempt at identification. In some embodiments, even if the item cannot be identified using the machine-readable code, item dimension data may still be determined, such as by using a depth sensor or a camera to determine one or more dimensions of the item. Accordingly, in some embodiments, after being routed to the exception handling location at block 432, the process flow 400 may proceed to block 434, at which item dimension data may be determined for the item that could not be identified. The item dimension data may be determined automatically using a sensor, input manually, or otherwise determined. The process flow 400 may then proceed to block 460.

If it is determined at determination block 430 that the item can be identified using the machine-readable code, the process flow 400 may proceed to block 440. At block 440, item information associated with the item may be determined. For example, the item may be associated with item information such as an item identifier, various item characteristics, such as color, shape, size and/or dimensions, etc., and other information.

At determination block 450, a determination may be made as to whether the item information includes item dimension data. For example, the item information may include one or more of a length, a width, a height, a volume, or other dimension information for the item. In some embodiments, the dimension information may be used to determine a volume of the item, which can then be used to calculate a remaining capacity for a container into which the item is deposited (e.g., by subtracting the item volume (and the volume of any other items in the container) from the volume of the container, etc.). In some instances, item information may not include item dimension data. For example, the item dimension data may be missing or otherwise unavailable, may be out of date, or may not be included. If the item information includes item dimension data, the determination at determination block 450 may be positive. If the item information does not include item dimension data, the determination at determination block 450 may be may be negative. If it is determined at determination block 450 that the item information does not include item dimension data, the process flow 400 may proceed to block 452, at which default values for item dimension data may be determined. The default values may be dummy values or other default values that may be used to provide a non-zero input. The process flow 400 may proceed to block 460.

If it is determined at determination block 450 that the item information includes item dimension data, the process flow 400 may proceed to block 460. At block 460, the item volume may be calculated using the item dimension data. In some embodiments, the volume may be included in the item dimension data and may therefore not have to be calculated. In other embodiments, the volume may be calculated using one or more of the height, length, and/or width of the item.

At optional block 470, an estimated container capacity may be determined using the item volume. For example, based at least in part on the available capacity of the container (e.g., empty container volume minus volume of items inside the container, etc.) the estimated remaining container capacity may be determined by subtracting the item volume from the available capacity of the container to determine the estimated container capacity.

At optional determination block 480, a determination may be made as to whether the designated container will exceed a threshold filled capacity after receiving the item. For example, if the container will be more than a threshold level full (e.g., 55% full, 60% full, etc.) as determined by occupied capacity, or if the container will have less than a threshold capacity remaining (e.g., 40% capacity remaining, 35% capacity remaining, etc.), the determination at determination block 480 may be positive. If the designated container will not exceed the threshold filled capacity after receiving the item (e.g., the container will still have room or otherwise will be less full than the threshold, etc.), the determination at determination block 480 may be negative.

If it is determined at determination block 480 that the designated container will not exceed a threshold filled capacity after receiving the item, the process flow 400 may return to block 410 and the item may be delivered to the container. If the designated container will exceed a threshold filled capacity after receiving the item, the process flow 400 may proceed to optional block 490, at which a full indicator may be caused to be illuminated after the item is delivered to the container. For example, a light indicator, such as a red light, associated with the container may be illuminated to indicate to an operator that the container is full and/or is to be replaced with an empty container. In some embodiments, instead of a light indicator, a signal or other indication may be sent to another computer system, such as a downstream computer system. The signal may indicate or be representative of the capacity of a particular container, and may trigger automated retrieval of a container or another action.

Figure 5:
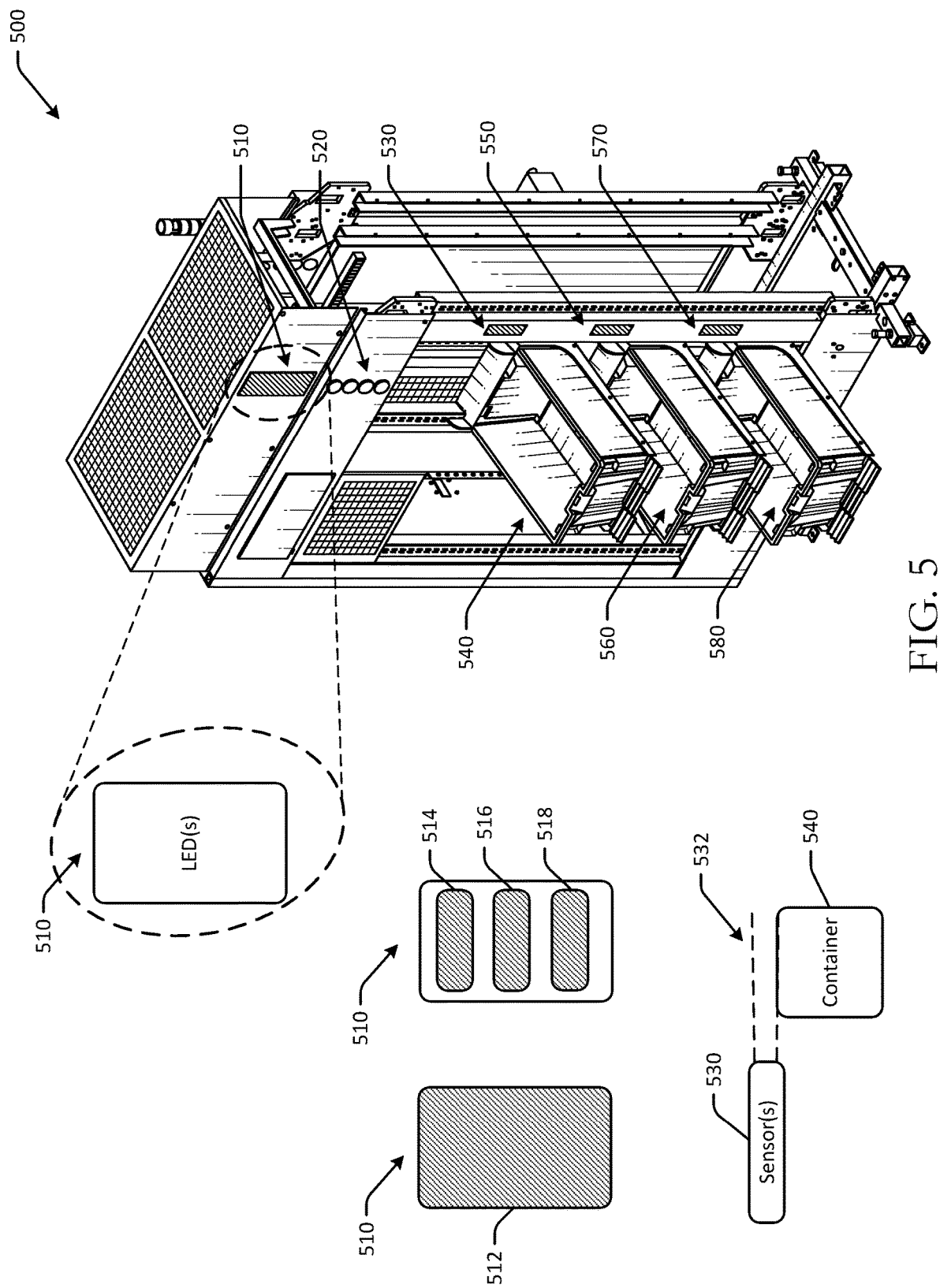
FIG. 5 is a schematic illustration of a perspective view and detail view of an overfilled container detection system coupled to a sortation system in accordance with one or more embodiments of the disclosure.

FIG. 5 is a schematic illustration of a perspective view and detail view of an overfilled container detection system coupled to a sortation system 500 in accordance with one or more embodiments of the disclosure. Other embodiments may include additional or fewer components. The illustration of FIG. 5 may not be to scale, and may not be illustrated to scale with respect to other figures. The overfilled container detection system and sortation system illustrated in FIG. 5 may be the same systems discussed with respect to FIGS. 1-4.

The sortation system 500 may include a number of containers arranged in a column. For example, the item sortation system 500 may include a first container 540, such as a first tote, a first bag, or another type of container, a second container 560, a third container 580, and so forth. Any number of containers may be arranged in a column or in rows. The containers may be configured to receive items. For example, some or all of the containers may be disposed adjacent to chutes. Shuttles may deposit items destined for a particular container into a corresponding chute. The item may move down the chute and into the corresponding container.

A container capacity detection system for use with an item sortation machine may be coupled to the sortation system 500. The container capacity detection system may include a first sensor 530 positioned to detect a remaining capacity of the first container 540 in the sortation system 500. The container capacity detection system may optionally include a second sensor 550 positioned to detect a remaining capacity of the second container 560 in the sortation system 500, and an optional third sensor 570 positioned to detect a remaining capacity of the third container 580 in the sortation system 500. The respective first sensor 530, second sensor 550, and third sensor 570 may be configured to determine a capacity of the corresponding containers. For example, the sensors may be disposed adjacent to a top of the container. In some embodiments, the sensors may be coupled to a frame of the sortation system 500. In other embodiments, the sensors may be coupled to the frame of the sortation system in an overhead arrangement relative to each container, such as that illustrated in FIG. 6. The sensors may be any suitable sensor, such as a Lidar sensor, an ultrasonic sensor, a depth sensor, a camera, or a different type of sensor.

The container capacity detection system may include one or more visual indicators 510. In some embodiments, the sortation system 500 may include a visual indicator 520 that represents whether an item is being delivered to a container in a column. The visual indicator 510 may be a display, one or more lights such as LEDs, or other visual indicators. The visual indicators 510 may represent to an operator that a container is full, approaching fullness, and/or is otherwise to be retrieved and/or replaced at the sortation system 500. The components of the container capacity detection system, including the controller or computer system, may be removably coupled to the sortation system 500.

For example, as illustrated in a detail view of the visual indicator 510, the visual indicator may include one or more LEDs. In one example embodiment, the visual indicator may include one LED 512 for a column or for each container in the column (e.g., three LEDs for the three containers in the example of FIG. 5, etc.). For embodiments with one LED for the column, the LED may be illuminated when any one of the containers is a threshold level full or has less than a threshold remaining capacity. In an embodiment where one LED is included for each container, the respective LEDs may illuminate as the corresponding container is a threshold level full or has less than a threshold remaining capacity, as determined using sensor feedback. In another embodiment, more than one LED may be associated with a particular container. For example, a first LED or other light indicator 514 may be a green light indicator and may indicate the container is substantially empty, a second light indicator 516 may be a yellow light indicator and may indicate the container is approaching the threshold, a third light indicator 518 may be a green light indicator and may indicate the container has passed the threshold and/or is to be removed from the sortation system 500. Other colors of light may be used, and any number of light indicators maybe included. The respective light indicators may be removably coupled to a frame of the sortation system 500.

In some embodiments, a first light indicator may be associated with the first container 540, a second light indicator may be associated with the second container 560, and a third light indicator may be associated with the third container 580. In some embodiments, the first light indicator may be configured to emit light having a first color, the second light indicator may be configured to emit light having a second color, and the third light indicator may be configured to emit light having a third color. The colors may be different colors or may be the same colors. In other embodiments, different indicators may be used, such as infrared light indicators, wireless communication indicators, such as wireless signals, commands, or directives sent to other computer systems, and so forth. Accordingly, instead of emitting light, some embodiments may trigger an indicator responsive to container capacity level detections.

Containers may be removed from the sortation system 500 when full or when a certain threshold amount of capacity remains or a certain amount of capacity is full. For example, containers may be removed from the sortation system 500 when the container is 50% capacity is full, 60% capacity is full, 70% capacity is full, 80% capacity is full, 90% capacity is full, 100% capacity is full, or at another threshold. In another example, containers may be removed from the sortation system 500 when 50% capacity remains, 60% capacity remains, 70% capacity remains, 80% capacity remains, 90% capacity remains, 100% capacity remains, and so forth. When a container is removed, it may be replaced with an empty container. Containers may be removed manually or automatically.

As depicted in the schematic drawing illustrated in FIG. 5, to determine container capacity and/or whether a container is full, the first sensor 530 may use reflective light 532 or another technique (such as a field of view of a camera in embodiments where cameras are used instead of Lidar or ultrasonic sensors, etc.) to image contents in the first container 540, and to determine whether an occupied capacity is greater than or equal to a threshold and/or whether an available capacity or a remaining capacity is less than a threshold. Feedback from the sensors may be used by a controller of the container capacity detection system to determine whether to illuminate any visual indicators. For example, the controller may be configured to determine, using the first sensor, that the remaining capacity of the first container is less than or equal to a first threshold, and may therefore cause the first light indicator to emit light. The first threshold may be any suitable value, such as between about 35% remaining capacity and about 55% remaining capacity, such as about 45% remaining capacity. The controller may be configured to determine that the first container 540 has been replaced, and may cause the first light indicator to be reset or otherwise disabled. In some embodiments, when the controller determines that the container is full, the controller may be configured to send a signal to the item sortation machine to pause delivery of items to the respective container.

In an embodiment, the controller may be configured to determine that the remaining capacity of the first container is less than or equal to a second threshold, and may therefore cause the second light indicator to emit light, and may determine that the remaining capacity of the first container is less than or equal to a third threshold, and may cause the third light indicator to emit light. In this example, the first threshold may be a level indicating the container is full, the second threshold may be a level indicating the container is approaching the full level, and the third threshold may be a level indicating the container is substantially empty.

In another embodiment, a container capacity detection system may include a first sensor positioned to detect a remaining capacity of a first container in an item sortation system, a plurality of light indicators, and a controller. The controller may be configured to determine, using the first sensor, that the remaining capacity of the first container is less than or equal to a first threshold, and may therefore cause a first light indicator, such as a green light, of the plurality of light indicators to emit light. The controller may determine that the remaining capacity of the first container is less than or equal to a second threshold, and may cause a second light indicator, such as a yellow light, of the plurality of light indicators to emit light. The controller may determine that the remaining capacity of the first container is less than or equal to a third threshold, and may therefore cause a third light indicator, such as a red light, of the plurality of light indicators to emit light.

In an embodiment, the item sortation system and/or a separate computer system in communication with a sensor system may be configured to determine container capacity and/or whether a container is full or is otherwise to be replaced. For example, a computer system or a controller may be configured to determine, using data from a Lidar sensor or other sensor system, that a first item is protruding out of the first container 430. The Lidar sensor may be coupled to a robotic arm, a gantry robot, or a different automated component that may allow for movement of the Lidar sensor to read container capacities of different containers. The controller may cause the first container to be automatically removed from the item sortation system and transported to a shaking table for settling of the first item. For example, because an item was protruding from the container, the container may be automatically transported to a shaking table or other surface for shaking of the container to cause settlement of the items in the container. In one example, a robotic arm may transport the container from the item sortation system 400 to the shaking table or other surface. The container may again be checked to determine whether an item is protruding, and if not, may be sent downstream for further processing. If so, the shaking process may be repeated. For containers that do not have items protruding from a top of the container, the controller may determine, using data from the Lidar sensor, that an item is not protruding out of the second container, and may cause the second container to be automatically removed from the item sortation system 400 and transported to a downstream processing station.

In some embodiments, an indication of the Lidar sensor feedback or the corresponding determination as to whether a container is full may be sent or otherwise provided to a downstream processing station to trigger additional operations, such as removal of a container, replacement of a container, transport of a container to a shaking table, etc.

Figure 6:
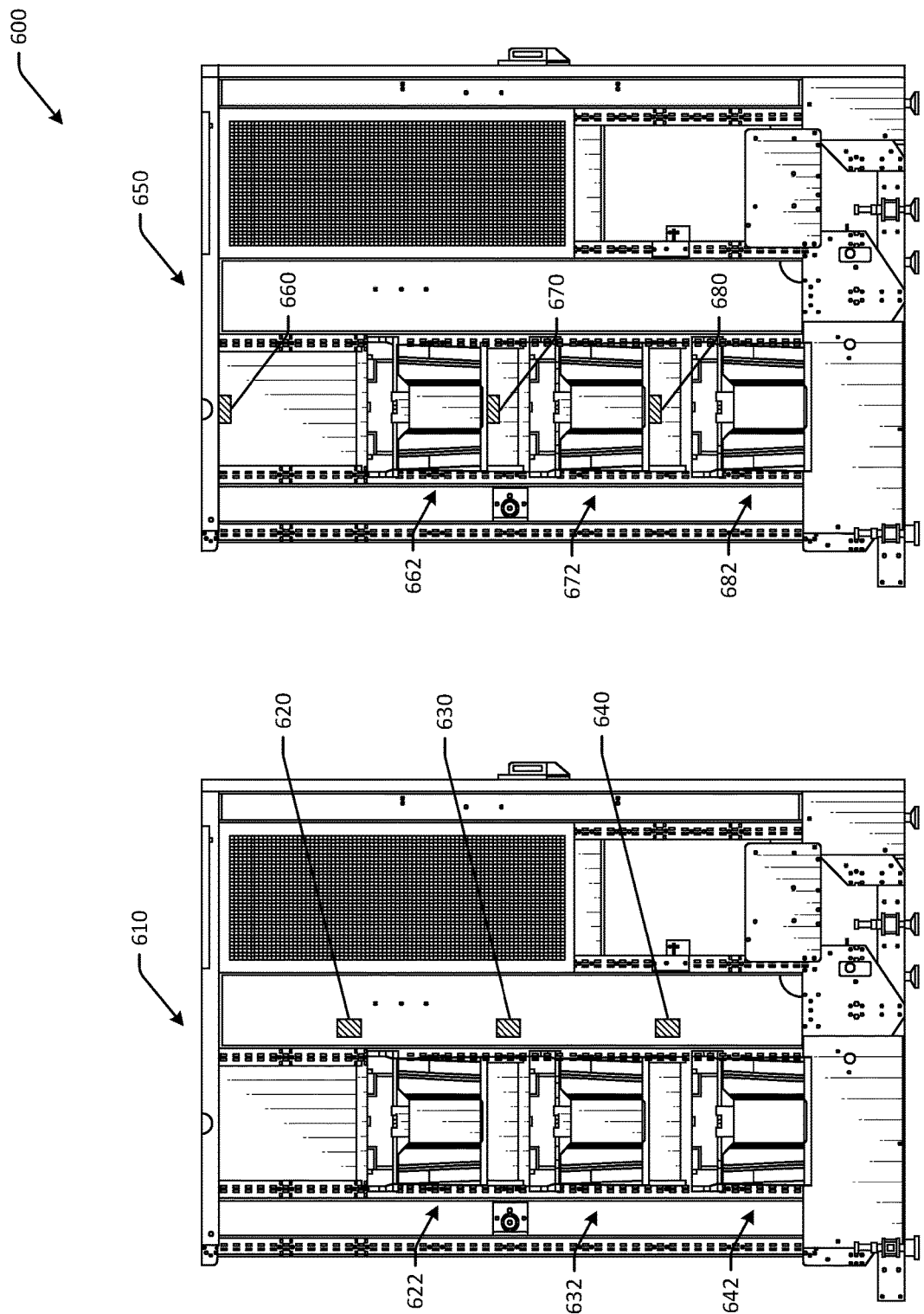
FIG. 6 is a schematic illustration of various overfilled container detection systems coupled to sortation systems in accordance with one or more embodiments of the disclosure.

FIG. 6 is a schematic illustration of various overfilled container detection systems 600 coupled to sortation systems in accordance with one or more embodiments of the disclosure. Other embodiments may include additional or fewer components. The illustration of FIG. 6 may not be to scale, and may not be illustrated to scale with respect to other figures. The item sorting system illustrated in FIG. 6 may be the same universal item sorter discussed with respect to FIGS. 1-5.

In a first embodiment 610, a sortation system may include a number of containers and corresponding mesh flaps. For example, the sortation system may include a first container 622, a second container 632, and a third container 642. An overfilled container detection system or a container capacity detection system may be coupled to the sortation system. The container capacity detection system may include a first sensor 620 positioned to determine a capacity of the first container 622. For example, the first sensor 620 may be disposed adjacent to a top of the first container 622. The first sensor 620 may be a Lidar sensor, an ultrasonic sensor, a camera, or other type of sensor and may be used to determine capacity of the first container 622. Similarly, a second sensor 630 may be positioned to determine a capacity of the second container 632. For example, the second sensor 630 may be disposed adjacent to a top of the second container 632. The second sensor 630 may be a Lidar sensor, an ultrasonic sensor, a camera, or other type of sensor and may be used to determine capacity of the second container 632. A third sensor 640 may be positioned to determine a capacity of the third container 642. For example, the third sensor 640 may be disposed adjacent to a top of the third container 642. The third sensor 640 may be a Lidar sensor, an ultrasonic sensor, a camera, or other type of sensor and may be used to determine capacity of the third container 642.

In a second embodiment 650, unlike the positioning of the sensors to the side of the respective containers in the first embodiment 610, sensors may be positioned overhead relative to corresponding containers. For example, the sortation system may include a first container 662, a second container 672, and a third container 682. An overfilled container detection system or a container capacity detection system may be coupled to the sortation system. The container capacity detection system may include a first sensor 660 positioned to determine a capacity of the first container 662. For example, the first sensor 660 may be disposed adjacent to a top of the first container 662. The first sensor 660 may be a Lidar sensor, an ultrasonic sensor, a camera, or other type of sensor and may be used to determine capacity of the first container 662. Similarly, a second sensor 670 may be positioned to determine a capacity of the second container 672. For example, the second sensor 670 may be disposed adjacent to a top of the second container 672. The second sensor 670 may be a Lidar sensor, an ultrasonic sensor, a camera, or other type of sensor and may be used to determine capacity of the second container 672. A third sensor 680 may be positioned to determine a capacity of the third container 682. For example, the third sensor 680 may be disposed adjacent to a top of the third container 682. The third sensor 680 may be a Lidar sensor, an ultrasonic sensor, a camera, or other type of sensor and may be used to determine capacity of the third container 682.

Figure 7:
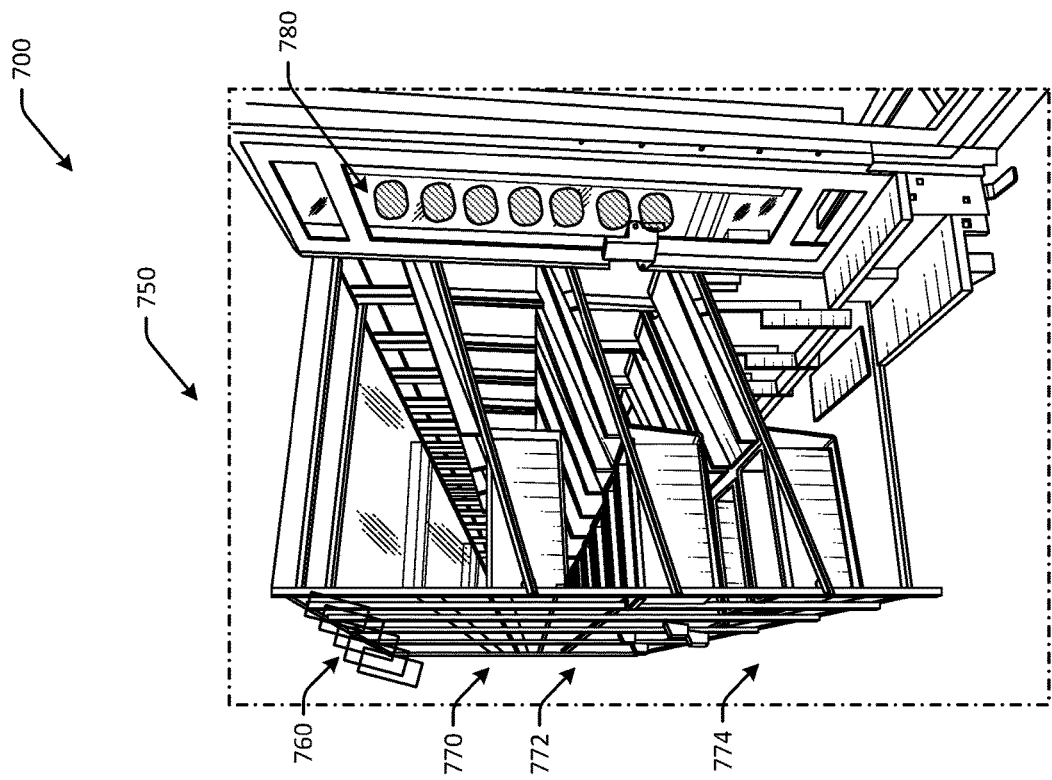
FIG. 7 is a schematic illustration of an overfilled container detection system coupled to a sortation system in accordance with one or more embodiments of the disclosure.
Figure 7:
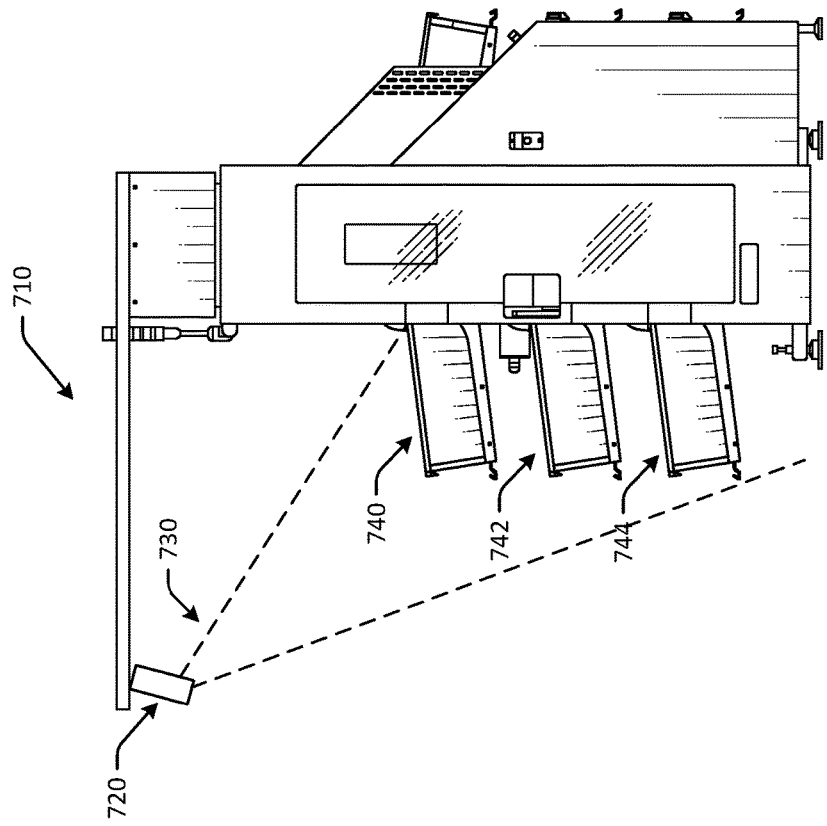

FIG. 7 is a schematic illustration of an overfilled container detection system coupled to a sortation system 700 in accordance with one or more embodiments of the disclosure. Other embodiments may include additional or fewer components. The illustration of FIG. 7 may not be to scale, and may not be illustrated to scale with respect to other figures. The system illustrated in FIG. 7 may be the same item sortation system discussed with respect to FIGS. 1-6.

In FIG. 7, at a single column 710, a set of containers may be arranged in a column of the item sortation system. For example, a first container 740, second container 742, and third container 744 may be arranged in a column. As items are sorted, the items may be deposited into the containers. For example, the first container 740 may receive items via a first chute, the second container 742 may receive items via a second chute, the third container 744 may receive items via a third chute, and so forth.

An overhead sensor system 720, such as a camera system or other sensor system, may be configured to image or otherwise determine a remaining capacity of containers in the column. For example, the overhead sensor system 720 may have a field of view 730 in which at least a portion of the interiors of the respective first container 740, second container 742, and third container 744. Based at least in part on data from the overhead sensor system 720, a controller of the container capacity detection system may determine an available capacity for each of the first container 740, second container 742, and third container 744. For the second container 742 and the third container 744, where the interior portions may not be fully visible or within the field of view 730 due to containers positioned relatively higher, the controller may determine an estimated capacity based at least in part on occupied capacity of the portion of the interior that is within the field of view 730. For example, if 50% of the interior portion visible in the field of view 730 is occupied, the controller may determine that 50% of the container is available capacity. Adjustments may be made based at least in part on a tilt of the container (e.g., if items roll or otherwise tend to one side of the container, etc.) to provide estimations of increased accuracy.

Each of the respective containers may be associated with visual indicators, such as light indicators. For example, the first light indicator may be associated with the first container, the second light indicator may be associated with the second container, and the third light indicator may be associated with the third container. The light indicators may be the same color or different colors, and each light indicator may include one or more colors. The light indicators may be triggered when the corresponding container satisfies a threshold level of fullness or a threshold level of remaining capacity.

In some embodiments, multiple columns may be disposed adjacent to each other as depicted in the sortation system 750 in FIG. 7. In such embodiments, a container capacity system may be coupled to the sortation system 750 and may include a set of overhead sensor systems 760 may be used to determine capacity of containers in individual columns. For example, a column may include a container in a first row 880, a container in a second row 772, and a container in a third row 774. Any number of rows or columns may be included. The container capacity system may include visual indicators 780 that may provide aggregate fullness level indicators for the various containers in the sortation system 750. For example, the visual indicators 7870 may include light indicators corresponding to individual containers in the sortation system 750.

As items are deposited into the respective containers, the containers may periodically be checked for capacity and/or fullness. For example, a Lidar sensor coupled to a frame of the sortation system or other component may be used to periodically determine capacity of the respective containers. For example, the Lidar sensor or other sensor system may be disposed adjacent to a top of a container, and a line scanning operation may be performed to determine whether any items are protruding from a top of the container and/or whether the container is full.

One or more operations of the methods, process flows, or use cases of FIGS. 1-7 may have been described above as being performed by a user device, or more specifically, by one or more program module(s), applications, or the like executing on a device. It should be appreciated, however, that any of the operations of the methods, process flows, or use cases of FIGS. 1-7 may be performed, at least in part, in a distributed manner by one or more other devices, or more specifically, by one or more program module(s), applications, or the like executing on such devices. In addition, it should be appreciated that processing performed in response to the execution of computer-executable instructions provided as part of an application, program module, or the like may be interchangeably described herein as being performed by the application or the program module itself or by a device on which the application, program module, or the like is executing. While the operations of the methods, process flows, or use cases of FIGS. 1-7 may be described in the context of the illustrative devices, it should be appreciated that such operations may be implemented in connection with numerous other device configurations.

The operations described and depicted in the illustrative methods, process flows, and use cases of FIGS. 1-7 may be carried out or performed in any suitable order, such as the depicted orders, as desired in various example embodiments of the disclosure. Additionally, in certain example embodiments, at least a portion of the operations may be carried out in parallel. Furthermore, in certain example embodiments, less, more, or different operations than those depicted in FIGS. 1-7 may be performed.

Although specific embodiments of the disclosure have been described, one of ordinary skill in the art will recognize that numerous other modifications and alternative embodiments are within the scope of the disclosure. For example, any of the functionality and/or processing capabilities described with respect to a particular device or component may be performed by any other device or component. Further, while various illustrative implementations and architectures have been described in accordance with embodiments of the disclosure, one of ordinary skill in the art will appreciate that numerous other modifications to the illustrative implementations and architectures described herein are also within the scope of this disclosure.

Certain aspects of the disclosure are described above with reference to block and flow diagrams of systems, methods, apparatuses, and/or computer program products according to example embodiments. It will be understood that one or more blocks of the block diagrams and flow diagrams, and combinations of blocks in the block diagrams and the flow diagrams, respectively, may be implemented by the execution of computer-executable program instructions. Likewise, some blocks of the block diagrams and flow diagrams may not necessarily need to be performed in the order presented, or may not necessarily need to be performed at all, according to some embodiments. Further, additional components and/or operations beyond those depicted in blocks of the block and/or flow diagrams may be present in certain embodiments.

Accordingly, blocks of the block diagrams and flow diagrams support combinations of means for performing the specified functions, combinations of elements or steps for performing the specified functions, and program instruction means for performing the specified functions. It will also be understood that each block of the block diagrams and flow diagrams, and combinations of blocks in the block diagrams and flow diagrams, may be implemented by special-purpose, hardware-based computer systems that perform the specified functions, elements or steps, or combinations of special-purpose hardware and computer instructions.

Illustrative Computer Architecture

Figure 8:
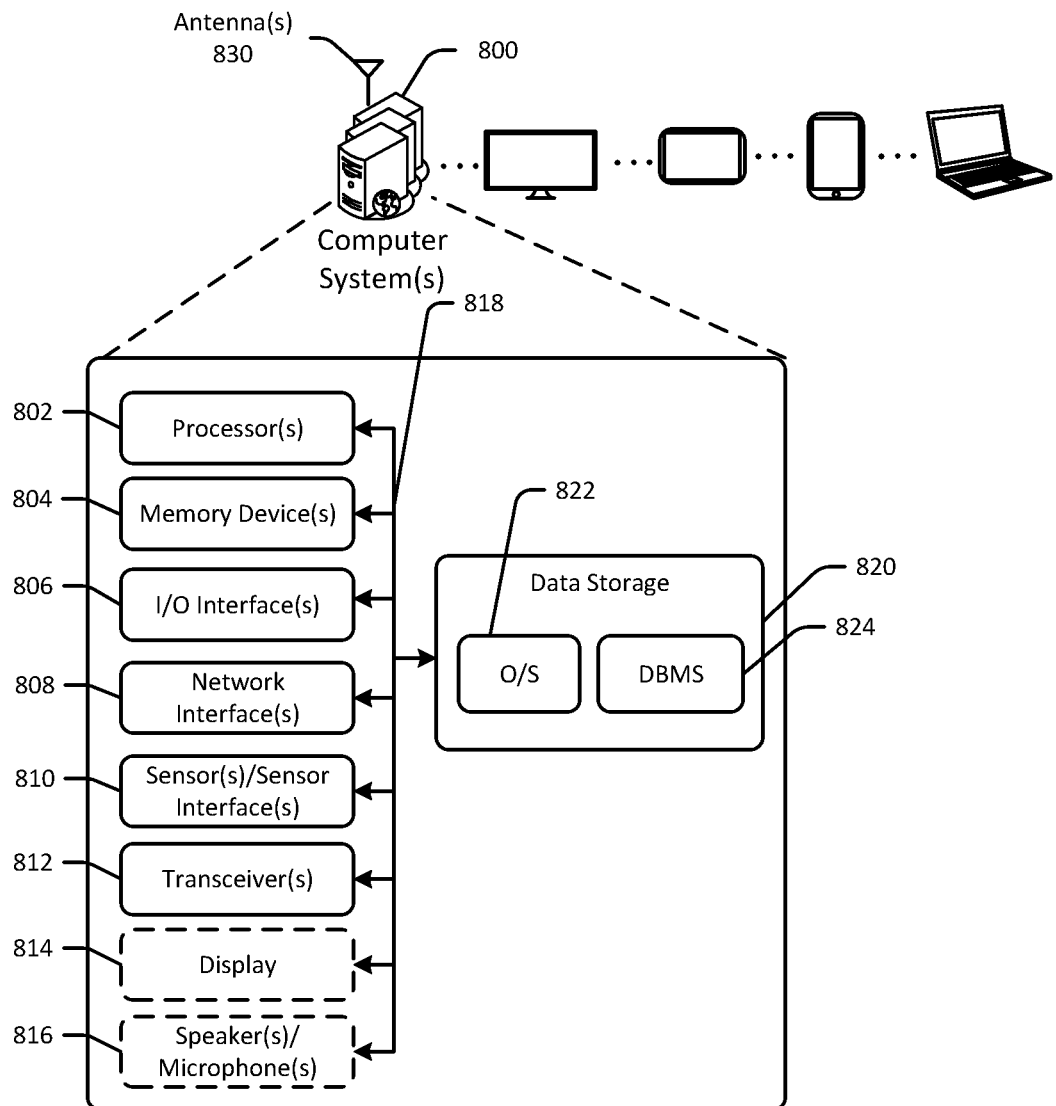
FIG. 8 schematically illustrates an example architecture of a computer system associated with an item sorting system in accordance with one or more embodiments of the disclosure.

FIG. 8 is a schematic block diagram of one or more illustrative computer system(s) 800 in accordance with one or more example embodiments of the disclosure. The computer system(s) 800 may include any suitable computing device including, but not limited to, a server system, a voice interaction device, a mobile device such as a smartphone, a tablet, an e-reader, a wearable device, or the like; a desktop computer; a laptop computer; a content streaming device; or the like. The computer system(s) 800 may correspond to an illustrative device configuration for a computer system used in conjunction with any one of the container capacity detection system(s) of FIGS. 1-7.

The computer system(s) 800 may be configured to communicate with one or more servers, user devices, or the like. The computer system(s) 800 may be configured to determine container capacity, determining Lidar or other sensor measurements, send commands or instructions, cause light indicators to illuminate, and so forth.

The computer system(s) 800 may be configured to communicate via one or more networks. Such network(s) may include, but are not limited to, any one or more different types of communications networks such as, for example, cable networks, public networks (e.g., the Internet), private networks (e.g., frame-relay networks), wireless networks, cellular networks, telephone networks (e.g., a public switched telephone network), or any other suitable private or public packet-switched or circuit-switched networks. Further, such network(s) may have any suitable communication range associated therewith and may include, for example, global networks (e.g., the Internet), metropolitan area networks (MANs), wide area networks (WANs), local area networks (LANs), or personal area networks (PANs). In addition, such network(s) may include communication links and associated networking devices (e.g., link-layer switches, routers, etc.) for transmitting network traffic over any suitable type of medium including, but not limited to, coaxial cable, twisted-pair wire (e.g., twisted-pair copper wire), optical fiber, a hybrid fiber-coaxial (HFC) medium, a microwave medium, a radio frequency communication medium, a satellite communication medium, or any combination thereof.

In an illustrative configuration, the computer system(s) 800 may include one or more processors (processor(s)) 802, one or more memory devices 804 (also referred to herein as memory 804), one or more input/output (I/O) interface(s) 806, one or more network interface(s) 808, one or more sensor(s) or sensor interface(s) 810, one or more transceiver(s) 812, one or more optional display(s) 814, one or more optional microphone(s) 816, and data storage 820. The computer system(s) 800 may further include one or more bus(es) 818 that functionally couple various components of the computer system(s) 800. The computer system(s) 800 may further include one or more antenna(s) 830 that may include, without limitation, a cellular antenna for transmitting or receiving signals to/from a cellular network infrastructure, an antenna for transmitting or receiving Wi-Fi signals to/from an access point (AP), a Global Navigation Satellite System (GNSS) antenna for receiving GNSS signals from a GNSS satellite, a Bluetooth antenna for transmitting or receiving Bluetooth signals, a Near Field Communication (NFC) antenna for transmitting or receiving NFC signals, and so forth. These various components will be described in more detail hereinafter.

The bus(es) 818 may include at least one of a system bus, a memory bus, an address bus, or a message bus, and may permit the exchange of information (e.g., data (including computer-executable code), signaling, etc.) between various components of the computer system(s) 800. The bus(es) 818 may include, without limitation, a memory bus or a memory controller, a peripheral bus, an accelerated graphics port, and so forth. The bus(es) 818 may be associated with any suitable bus architecture including, without limitation, an Industry Standard Architecture (ISA), a Micro Channel Architecture (MCA), an Enhanced ISA (EISA), a Video Electronics Standards Association (VESA) architecture, an Accelerated Graphics Port (AGP) architecture, a Peripheral Component Interconnect (PCI) architecture, a PCI-Express architecture, a Personal Computer Memory Card International Association (PCMCIA) architecture, a Universal Serial Bus (USB) architecture, and so forth.

The memory 804 of the computer system(s) 800 may include volatile memory (memory that maintains its state when supplied with power) such as random access memory (RAM) and/or non-volatile memory (memory that maintains its state even when not supplied with power) such as read-only memory (ROM), flash memory, ferroelectric RAM (FRAM), and so forth. Persistent data storage, as that term is used herein, may include non-volatile memory. In certain example embodiments, volatile memory may enable faster read/write access than non-volatile memory. However, in certain other example embodiments, certain types of non-volatile memory (e.g., FRAM) may enable faster read/write access than certain types of volatile memory.

In various implementations, the memory 804 may include multiple different types of memory such as various types of static random access memory (SRAM), various types of dynamic random access memory (DRAM), various types of unalterable ROM, and/or writeable variants of ROM such as electrically erasable programmable read-only memory (EEPROM), flash memory, and so forth. The memory 804 may include main memory as well as various forms of cache memory such as instruction cache(s), data cache(s), translation lookaside buffer(s) (TLBs), and so forth. Further, cache memory such as a data cache may be a multi-level cache organized as a hierarchy of one or more cache levels (L1, L2, etc.).

The data storage 820 may include removable storage and/or non-removable storage including, but not limited to, magnetic storage, optical disk storage, and/or tape storage. The data storage 820 may provide non-volatile storage of computer-executable instructions and other data. The memory 804 and the data storage 820, removable and/or non-removable, are examples of computer-readable storage media (CRSM) as that term is used herein.

The data storage 820 may store computer-executable code, instructions, or the like that may be loadable into the memory 804 and executable by the processor(s) 802 to cause the processor(s) 802 to perform or initiate various operations. The data storage 820 may additionally store data that may be copied to the memory 804 for use by the processor(s) 802 during the execution of the computer-executable instructions. Moreover, output data generated as a result of execution of the computer-executable instructions by the processor(s) 802 may be stored initially in the memory 804, and may ultimately be copied to the data storage 820 for non-volatile storage.

More specifically, the data storage 820 may store one or more operating systems (O/S) 822; one or more database management systems (DBMS) 824; and one or more program module(s), applications, engines, computer-executable code, scripts, or the like. Some or all of these module(s) may be sub-module(s). Any of the components depicted as being stored in the data storage 820 may include any combination of software, firmware, and/or hardware. The software and/or firmware may include computer-executable code, instructions, or the like that may be loaded into the memory 804 for execution by one or more of the processor(s) 802. Any of the components depicted as being stored in the data storage 820 may support functionality described in reference to corresponding components named earlier in this disclosure.

The data storage 820 may further store various types of data utilized by the components of the computer system(s) 800. Any data stored in the data storage 820 may be loaded into the memory 804 for use by the processor(s) 802 in executing computer-executable code. In addition, any data depicted as being stored in the data storage 820 may potentially be stored in one or more datastore(s) and may be accessed via the DBMS 824 and loaded in the memory 804 for use by the processor(s) 802 in executing computer-executable code. The datastore(s) may include, but are not limited to, databases (e.g., relational, object-oriented, etc.), file systems, flat files, distributed datastores in which data is stored on more than one node of a computer network, peer-to-peer network datastores, or the like.

The processor(s) 802 may be configured to access the memory 804 and execute the computer-executable instructions loaded therein. For example, the processor(s) 802 may be configured to execute the computer-executable instructions of the various program module(s), applications, engines, or the like of the computer system(s) 800 to cause or facilitate various operations to be performed in accordance with one or more embodiments of the disclosure. The processor(s) 802 may include any suitable processing unit capable of accepting data as input, processing the input data in accordance with stored computer-executable instructions, and generating output data. The processor(s) 802 may include any type of suitable processing unit including, but not limited to, a central processing unit, a microprocessor, a Reduced Instruction Set Computer (RISC) microprocessor, a Complex Instruction Set Computer (CISC) microprocessor, a microcontroller, an Application Specific Integrated Circuit (ASIC), a Field-Programmable Gate Array (FPGA), a System-on-a-Chip (SoC), a digital signal processor (DSP), and so forth. Further, the processor(s) 802 may have any suitable microarchitecture design that includes any number of constituent components such as, for example, registers, multiplexers, arithmetic logic units, cache controllers for controlling read/write operations to cache memory, branch predictors, or the like. The microarchitecture design of the processor(s) 802 may be capable of supporting any of a variety of instruction sets.

Referring now to other illustrative components depicted as being stored in the data storage 820, the O/S 822 may be loaded from the data storage 820 into the memory 804 and may provide an interface between other application software executing on the computer system(s) 800 and the hardware resources of the computer system(s) 800. More specifically, the O/S 822 may include a set of computer-executable instructions for managing the hardware resources of the computer system(s) 800 and for providing common services to other application programs (e.g., managing memory allocation among various application programs). In certain example embodiments, the O/S 822 may control execution of the other program module(s). The O/S 822 may include any operating system now known or which may be developed in the future including, but not limited to, any server operating system, any mainframe operating system, or any other proprietary or non-proprietary operating system.

The DBMS 824 may be loaded into the memory 804 and may support functionality for accessing, retrieving, storing, and/or manipulating data stored in the memory 804 and/or data stored in the data storage 820. The DBMS 824 may use any of a variety of database models (e.g., relational model, object model, etc.) and may support any of a variety of query languages. The DBMS 824 may access data represented in one or more data schemas and stored in any suitable data repository including, but not limited to, databases (e.g., relational, object-oriented, etc.), file systems, flat files, distributed datastores in which data is stored on more than one node of a computer network, peer-to-peer network datastores, or the like. In those example embodiments in which the computer system(s) 800 is a mobile device, the DBMS 824 may be any suitable lightweight DBMS optimized for performance on a mobile device.

Referring now to other illustrative components of the computer system(s) 800, the input/output (I/O) interface(s) 806 may facilitate the receipt of input information by the computer system(s) 800 from one or more I/O devices as well as the output of information from the computer system(s) 800 to the one or more I/O devices. The I/O devices may include any of a variety of components such as a display or display screen having a touch surface or touchscreen; an audio output device for producing sound, such as a speaker; an audio capture device, such as a microphone; an image and/or video capture device, such as a camera; a haptic unit; and so forth. Any of these components may be integrated into the computer system(s) 800 or may be separate. The I/O devices may further include, for example, any number of peripheral devices such as data storage devices, printing devices, and so forth.

The I/O interface(s) 806 may also include an interface for an external peripheral device connection such as universal serial bus (USB), FireWire, Thunderbolt, Ethernet port or other connection protocol that may connect to one or more networks. The I/O interface(s) 806 may also include a connection to one or more of the antenna(s) 830 to connect to one or more networks via a wireless local area network (WLAN) (such as Wi-Fi) radio, Bluetooth, ZigBee, and/or a wireless network radio, such as a radio capable of communication with a wireless communication network such as a Long Term Evolution (LTE) network, WiMAX network, 3G network, a ZigBee network, etc.

The computer system(s) 800 may further include one or more network interface(s) 808 via which the computer system(s) 800 may communicate with any of a variety of other systems, platforms, networks, devices, and so forth. The network interface(s) 808 may enable communication, for example, with one or more wireless routers, one or more host servers, one or more web servers, and the like via one or more networks.

The antenna(s) 830 may include any suitable type of antenna depending, for example, on the communications protocols used to transmit or receive signals via the antenna(s) 830. Non-limiting examples of suitable antennas may include directional antennas, non-directional antennas, dipole antennas, folded dipole antennas, patch antennas, multiple-input multiple-output (MIMO) antennas, or the like. The antenna(s) 830 may be communicatively coupled to one or more transceivers 812 or radio components to which or from which signals may be transmitted or received.

As previously described, the antenna(s) 830 may include a cellular antenna configured to transmit or receive signals in accordance with established standards and protocols, such as Global System for Mobile Communications (GSM), 3G standards (e.g., Universal Mobile Telecommunications System (UMTS), Wideband Code Division Multiple Access (W-CDMA), CDMA2000, etc.), 4G standards (e.g., Long-Term Evolution (LTE), WiMax, etc.), direct satellite communications, or the like.

The antenna(s) 830 may additionally, or alternatively, include a Wi-Fi antenna configured to transmit or receive signals in accordance with established standards and protocols, such as the IEEE 802.11 family of standards, including via 2.4 GHz channels (e.g., 802.11b, 802.11g, 802.11n), 5 GHz channels (e.g., 802.11n, 802.11ac), or 60 GHz channels (e.g., 802.11ad). In alternative example embodiments, the antenna(s) 830 may be configured to transmit or receive radio frequency signals within any suitable frequency range forming part of the unlicensed portion of the radio spectrum.

The antenna(s) 830 may additionally, or alternatively, include a GNSS antenna configured to receive GNSS signals from three or more GNSS satellites carrying time-position information to triangulate a position therefrom. Such a GNSS antenna may be configured to receive GNSS signals from any current or planned GNSS such as, for example, the Global Positioning System (GPS), the GLONASS System, the Compass Navigation System, the Galileo System, or the Indian Regional Navigational System.

The transceiver(s) 812 may include any suitable radio component(s) for—in cooperation with the antenna(s) 830—transmitting or receiving radio frequency (RF) signals in the bandwidth and/or channels corresponding to the communications protocols utilized by the computer system(s) 800 to communicate with other devices. The transceiver(s) 812 may include hardware, software, and/or firmware for modulating, transmitting, or receiving—potentially in cooperation with any of antenna(s) 830—communications signals according to any of the communications protocols discussed above including, but not limited to, one or more Wi-Fi and/or Wi-Fi direct protocols, as standardized by the IEEE 802.11 standards, one or more non-Wi-Fi protocols, or one or more cellular communications protocols or standards. The transceiver(s) 812 may further include hardware, firmware, or software for receiving GNSS signals. The transceiver(s) 812 may include any known receiver and baseband suitable for communicating via the communications protocols utilized by the computer system(s) 800. The transceiver(s) 812 may further include a low noise amplifier (LNA), additional signal amplifiers, an analog-to-digital (A/D) converter, one or more buffers, a digital baseband, or the like.

The sensor(s)/sensor interface(s) 810 may include or may be capable of interfacing with any suitable type of sensing device such as, for example, inertial sensors, force sensors, thermal sensors, photocells, and so forth. Example types of inertial sensors may include accelerometers (e.g., MEMS-based accelerometers), gyroscopes, and so forth.

The optional display(s) 814 may be configured to output light and/or render content. The optional speaker(s)/microphone(s) 816 may be any device configured to receive analog sound input or voice data.

It should be appreciated that the program module(s), applications, computer-executable instructions, code, or the like depicted in FIG. 8 as being stored in the data storage 820 are merely illustrative and not exhaustive and that processing described as being supported by any particular module may alternatively be distributed across multiple module(s) or performed by a different module. In addition, various program module(s), script(s), plug-in(s), Application Programming Interface(s) (API(s)), or any other suitable computer-executable code hosted locally on the computer system(s) 800, and/or hosted on other computing device(s) accessible via one or more networks, may be provided to support functionality provided by the program module(s), applications, or computer-executable code depicted in FIG. 8 and/or additional or alternate functionality. Further, functionality may be modularized differently such that processing described as being supported collectively by the collection of program module(s) depicted in FIG. 8 may be performed by a fewer or greater number of module(s), or functionality described as being supported by any particular module may be supported, at least in part, by another module. In addition, program module(s) that support the functionality described herein may form part of one or more applications executable across any number of systems or devices in accordance with any suitable computing model such as, for example, a client-server model, a peer-to-peer model, and so forth. In addition, any of the functionality described as being supported by any of the program module(s) depicted in FIG. 8 may be implemented, at least partially, in hardware and/or firmware across any number of devices.

It should further be appreciated that the computer system(s) 800 may include alternate and/or additional hardware, software, or firmware components beyond those described or depicted without departing from the scope of the disclosure. More particularly, it should be appreciated that software, firmware, or hardware components depicted as forming part of the computer system(s) 800 are merely illustrative and that some components may not be present or additional components may be provided in various embodiments. While various illustrative program module(s) have been depicted and described as software module(s) stored in the data storage 820, it should be appreciated that functionality described as being supported by the program module(s) may be enabled by any combination of hardware, software, and/or firmware. It should further be appreciated that each of the above-mentioned module(s) may, in various embodiments, represent a logical partitioning of supported functionality. This logical partitioning is depicted for ease of explanation of the functionality and may not be representative of the structure of software, hardware, and/or firmware for implementing the functionality. Accordingly, it should be appreciated that functionality described as being provided by a particular module may, in various embodiments, be provided at least in part by one or more other module(s). Further, one or more depicted module(s) may not be present in certain embodiments, while in other embodiments, additional module(s) not depicted may be present and may support at least a portion of the described functionality and/or additional functionality. Moreover, while certain module(s) may be depicted and described as sub-module(s) of another module, in certain embodiments, such module(s) may be provided as independent module(s) or as sub-module(s) of other module(s).

One or more operations of the methods, process flows, and use cases of FIGS. 1-7 may be performed by a device having the illustrative configuration depicted in FIG. 8, or more specifically, by one or more engines, program module(s), applications, or the like executable on such a device. It should be appreciated, however, that such operations may be implemented in connection with numerous other device configurations.

The operations described and depicted in the illustrative methods and process flows of any of FIGS. 1-7 may be carried out or performed in any suitable order as desired in various example embodiments of the disclosure. Additionally, in certain example embodiments, at least a portion of the operations may be carried out in parallel. Furthermore, in certain example embodiments, less, more, or different operations than those depicted in FIGS. 1-7 may be performed.

Although specific embodiments of the disclosure have been described, one of ordinary skill in the art will recognize that numerous other modifications and alternative embodiments are within the scope of the disclosure. For example, any of the functionality and/or processing capabilities described with respect to a particular device or component may be performed by any other device or component. Further, while various illustrative implementations and architectures have been described in accordance with embodiments of the disclosure, one of ordinary skill in the art will appreciate that numerous other modifications to the illustrative implementations and architectures described herein are also within the scope of this disclosure.

Certain aspects of the disclosure are described above with reference to block and flow diagrams of systems, methods, apparatuses, and/or computer program products according to example embodiments. It will be understood that one or more blocks of the block diagrams and flow diagrams, and combinations of blocks in the block diagrams and the flow diagrams, respectively, may be implemented by execution of computer-executable program instructions. Likewise, some blocks of the block diagrams and flow diagrams may not necessarily need to be performed in the order presented, or may not necessarily need to be performed at all, according to some embodiments. Further, additional components and/or operations beyond those depicted in blocks of the block and/or flow diagrams may be present in certain embodiments.

Accordingly, blocks of the block diagrams and flow diagrams support combinations of means for performing the specified functions, combinations of elements or steps for performing the specified functions, and program instruction means for performing the specified functions. It will also be understood that each block of the block diagrams and flow diagrams, and combinations of blocks in the block diagrams and flow diagrams, may be implemented by special-purpose, hardware-based computer systems that perform the specified functions, elements or steps, or combinations of special-purpose hardware and computer instructions.

Program module(s), applications, or the like disclosed herein may include one or more software components including, for example, software objects, methods, data structures, or the like. Each such software component may include computer-executable instructions that, responsive to execution, cause at least a portion of the functionality described herein (e.g., one or more operations of the illustrative methods described herein) to be performed.

A software component may be coded in any of a variety of programming languages. An illustrative programming language may be a lower-level programming language such as an assembly language associated with a particular hardware architecture and/or operating system platform. A software component comprising assembly language instructions may require conversion into executable machine code by an assembler prior to execution by the hardware architecture and/or platform.

Another example programming language may be a higher-level programming language that may be portable across multiple architectures. A software component comprising higher-level programming language instructions may require conversion to an intermediate representation by an interpreter or a compiler prior to execution.

Other examples of programming languages include, but are not limited to, a macro language, a shell or command language, a job control language, a script language, a database query or search language, or a report writing language. In one or more example embodiments, a software component comprising instructions in one of the foregoing examples of programming languages may be executed directly by an operating system or other software component without having to be first transformed into another form.

A software component may be stored as a file or other data storage construct. Software components of a similar type or functionally related may be stored together such as, for example, in a particular directory, folder, or library. Software components may be static (e.g., pre-established or fixed) or dynamic (e.g., created or modified at the time of execution).

Software components may invoke or be invoked by other software components through any of a wide variety of mechanisms. Invoked or invoking software components may comprise other custom-developed application software, operating system functionality (e.g., device drivers, data storage (e.g., file management) routines, other common routines and services, etc.), or third-party software components (e.g., middleware, encryption, or other security software, database management software, file transfer or other network communication software, mathematical or statistical software, image processing software, and format translation software).

Software components associated with a particular solution or system may reside and be executed on a single platform or may be distributed across multiple platforms. The multiple platforms may be associated with more than one hardware vendor, underlying chip technology, or operating system. Furthermore, software components associated with a particular solution or system may be initially written in one or more programming languages, but may invoke software components written in another programming language.

Computer-executable program instructions may be loaded onto a special-purpose computer or other particular machine, a processor, or other programmable data processing apparatus to produce a particular machine, such that execution of the instructions on the computer, processor, or other programmable data processing apparatus causes one or more functions or operations specified in the flow diagrams to be performed. These computer program instructions may also be stored in a computer-readable storage medium (CRSM) that upon execution may direct a computer or other programmable data processing apparatus to function in a particular manner, such that the instructions stored in the computer-readable storage medium produce an article of manufacture including instruction means that implement one or more functions or operations specified in the flow diagrams. The computer program instructions may also be loaded onto a computer or other programmable data processing apparatus to cause a series of operational elements or steps to be performed on the computer or other programmable apparatus to produce a computer-implemented process.

Additional types of CRSM that may be present in any of the devices described herein may include, but are not limited to, programmable random access memory (PRAM), SRAM, DRAM, RAM, ROM, electrically erasable programmable read-only memory (EEPROM), flash memory or other memory technology, compact disc read-only memory (CD-ROM), digital versatile disc (DVD) or other optical storage, magnetic cassettes, magnetic tape, magnetic disk storage or other magnetic storage devices, or any other medium which can be used to store the information and which can be accessed. Combinations of any of the above are also included within the scope of CRSM. Alternatively, computer-readable communication media (CRCM) may include computer-readable instructions, program module(s), or other data transmitted within a data signal, such as a carrier wave, or other transmission. However, as used herein, CRSM does not include CRCM.

Although embodiments have been described in language specific to structural features and/or methodological acts, it is to be understood that the disclosure is not necessarily limited to the specific features or acts described. Rather, the specific features and acts are disclosed as illustrative forms of implementing the embodiments. Conditional language, such as, among others, "can," "could," "might," or "may," unless specifically stated otherwise, or otherwise understood within the context as used, is generally intended to convey that certain embodiments could include, while other embodiments do not include, certain features, elements, and/or steps. Thus, such conditional language is not generally intended to imply that features, elements, and/or steps are in any way required for one or more embodiments or that one or more embodiments necessarily include logic for deciding, with or without user input or prompting, whether these features, elements, and/or steps are included or are to be performed in any particular embodiment.

That which is claimed is:

1. A system comprising:
   an item sortation system comprising:
      a first container configured to receive items via a first chute;
      a second container configured to receive items via a second chute; and
      a third container configured to receive items via a third chute, wherein the first container, the second container, and the third container are arranged in a column; and
   a container capacity detection system removably coupled to the item sortation system, the container capacity detection system comprising:
      a first sensor positioned to detect a remaining capacity of the first container of the item sortation system;
      a second sensor positioned to detect a remaining capacity of the second container of the item sortation system;
      a third sensor positioned to detect a remaining capacity of the third container of the item sortation system;
      a first light indicator configured to emit light having a first color;
      a second light indicator configured to emit light having a second color;
      a third light indicator configured to emit light having a third color; and
      a controller configured to:
         determine, using the first sensor, that the remaining capacity of the first container is less than or equal to a first threshold;
         cause the first light indicator to emit light;
         determine that the remaining capacity of the first container is less than or equal to a second threshold;
         cause the second light indicator to emit light;
         determine that the remaining capacity of the first container is less than or equal to a third threshold; and
         cause the third light indicator to emit light.

2. The system of claim 1, wherein the controller is further configured to:
   determine that the remaining capacity of the third container is less than or equal to the first threshold; and
   cause the third light indicator to emit light.

3. The system of claim 1, wherein the controller is further configured to:
   send a signal to the item sortation machine to pause delivery of items to the first container.

4. The system of claim 1, wherein the first sensor is positioned adjacent to the first container, the second sensor is positioned adjacent to the second container, and the third sensor is positioned adjacent to the third container; and
   wherein the first light indicator, the second light indicator, and the third light indicator are coupled to a frame of the item sortation system.

5. A container capacity detection system for use with an item sortation machine, the container capacity detection system comprising:
   a first light indicator;
   a second light indicator;
   a first sensor positioned to detect a remaining capacity of a first container in the item sortation system; and
   a controller configured to:
      determine, using the first sensor, that the remaining capacity of the first container is less than or equal to a first threshold;
      send a first signal representing the remaining capacity of the first container;
      cause the first light indicator to emit light;
      determine that the remaining capacity of the first container is less than or equal to a second threshold; and
      cause the second light indicator to emit light.

6. The container capacity detection system of claim 5, wherein the container capacity detection system is removably coupled to the item sortation system.

7. The container capacity detection system of claim 5, wherein the first sensor is coupled to a frame of the item sortation system.

8. The container capacity detection system of claim 5, further comprising:
   a second sensor positioned to detect a remaining capacity of a second container in the item sortation system;
   a third sensor positioned to detect a remaining capacity of a third container in the item sortation system;
   and a third light indicator;
   wherein the first container, the second container, and the third container are arranged in a column, and wherein the first light indicator is associated with the first container, the second light indicator is associated with the second container, and the third light indicator is associated with the third container.

9. The container capacity detection system of claim 8, wherein the first sensor is a camera positioned to image contents of the first container, the second container, and the third container.

10. The container capacity detection system of claim 5, wherein the controller is further configured to:
determine that the first container has been replaced; and
reset the first light indicator.

11. The container capacity detection system of claim 5, wherein the controller is further configured to:
send a second signal to the item sortation machine to pause delivery of items to the first container.

12. The container capacity detection system of claim 5, wherein the first light indicator is configured to emit light having a first color and the second light indicator is configured to emit light having a second color, the container capacity detection system further comprising:
a third light indicator configured to emit light having a third color.

13. The container capacity detection system of claim 12, wherein the controller is further configured to:
determine that the remaining capacity of the first container is less than or equal to a third threshold; and
cause the third light indicator to emit light.

14. The container capacity detection system of claim 5, wherein the first threshold is between about 35% remaining capacity and about 45% remaining capacity.

15. The container capacity detection system of claim 5, wherein the first sensor is a Lidar sensor, an ultrasonic sensor, a depth sensor, or a camera.

16. A system for use with an item sortation machine, the system comprising:
a first sensor positioned to detect a remaining capacity of a first container in the item sortation system;
a plurality of indicators; and
a controller configured to:
determine, using the first sensor, that the remaining capacity of the first container is less than or equal to a first threshold;
trigger a first indicator of the plurality of indicators;
determine that the remaining capacity of the first container is less than or equal to a second threshold; and
trigger a second indicator of the plurality of indicators.

17. The system of claim 16, wherein the controller is further configured to:
determine that the remaining capacity of the first container is less than or equal to a third threshold; and
trigger a third indicator of the plurality of indicators.

18. The system of claim 16, wherein the system is removably coupled to the item sortation system.

19. The system of claim 16, wherein the first sensor and the plurality of indicators is coupled to a frame of the item sortation system.

* * * * *